(12) United States Patent
Masliah

(10) Patent No.: US 8,731,485 B2
(45) Date of Patent: *May 20, 2014

(54) RF SWITCHES

(71) Applicant: ACCO Semiconductor, Inc., Sunnyvale, CA (US)

(72) Inventor: Denis A. Masliah, St.-Germain en Laye (FR)

(73) Assignee: Acco Semiconductor, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/946,892

(22) Filed: Jul. 19, 2013

(65) Prior Publication Data

US 2013/0303093 A1    Nov. 14, 2013

Related U.S. Application Data

(63) Continuation of application No. 12/771,339, filed on Apr. 30, 2010.

(51) Int. Cl.
*H04B 1/44* (2006.01)

(52) U.S. Cl.
USPC .............................................. 455/78; 455/83

(58) Field of Classification Search
USPC ..................... 455/78, 83, 191.3, 562.1, 341
See application file for complete search history.

(56) References Cited

U.S. PATENT DOCUMENTS

| | | | |
|---|---|---|---|
| 4,255,714 A | 3/1981 | Rosen | |
| 4,353,036 A | 10/1982 | Hoover | |
| 4,523,111 A | 6/1985 | Baliga | |
| 4,811,075 A | 3/1989 | Eklund | |
| 4,841,466 A | 6/1989 | Christopher | |
| 5,061,903 A | 10/1991 | Vasile | |
| 5,126,807 A | 6/1992 | Baba et al. | |
| 5,296,400 A | 3/1994 | Park et al. | |

(Continued)

FOREIGN PATENT DOCUMENTS

| EP | 2006009009 | 1/1996 |
|---|---|---|
| GB | 2336485 A | 10/1999 |

(Continued)

OTHER PUBLICATIONS

Gautier, D., et al., "Improved Delta Sigma Modulators for High Speed Applications," Acco Semiconductors, Mar. 25, 2009.

(Continued)

*Primary Examiner* — Eugene Yun
(74) *Attorney, Agent, or Firm* — Peters Verny, LLP

(57) ABSTRACT

RF switching devices are provided that alternatively couple an antenna to either a transmitter amplifier or a receiver amplifier. An exemplary RF switching device comprises two valves, one for a receiver transmission line between the antenna and the receiver amplifier, the other for a transmitter transmission line between the antenna and the power amplifier. Each valve is switchably coupled between ground and its transmission line. When coupled to ground, current flowing through the valve increases the impedance of the transmission line thereby attenuating signals on the transmission line. When decoupled from ground, the impedance of the transmission line is essentially unaffected. The pair of valves is controlled such that when one valve is on the other valve is off, and vice versa, so that the antenna is either receiving signals from the power amplifier or the receiver amplifier is receiving signals from the antenna.

14 Claims, 10 Drawing Sheets

(56) References Cited

U.S. PATENT DOCUMENTS

| | | |
|---|---|---|
| 5,559,049 A | 9/1996 | Cho |
| 5,677,927 A | 10/1997 | Fullerton et al. |
| 5,898,198 A | 4/1999 | Herbert et al. |
| 5,912,490 A | 6/1999 | Hebert et al. |
| 5,969,582 A | 10/1999 | Boesch et al. |
| 6,061,008 A | 5/2000 | Abbey |
| 6,061,555 A | 5/2000 | Bultman et al. |
| 6,081,159 A | 6/2000 | Kim et al. |
| 6,088,484 A | 7/2000 | Mead |
| 6,222,764 B1 | 4/2001 | Kelly et al. |
| 6,242,978 B1 | 6/2001 | Danielsons |
| 6,275,177 B1 | 8/2001 | Ho et al. |
| 6,300,835 B1 | 10/2001 | Seely et al. |
| 6,304,608 B1 | 10/2001 | Chen et al. |
| 6,384,688 B1 | 5/2002 | Fujioka et al. |
| 6,414,545 B1 | 7/2002 | Zhang |
| 6,570,518 B2 | 5/2003 | Riley et al. |
| 6,600,369 B2 | 7/2003 | Mitzlaff |
| 6,633,195 B2 | 10/2003 | Baudelot et al. |
| 6,703,684 B2 | 3/2004 | Udrea et al. |
| 6,784,470 B2 | 8/2004 | Davis |
| 6,967,608 B1 | 11/2005 | Maloberti et al. |
| 7,049,669 B2 | 5/2006 | Ma et al. |
| 7,123,898 B2 | 10/2006 | Burgener et al. |
| 7,162,042 B2 | 1/2007 | Spencer et al. |
| 7,259,621 B2 | 8/2007 | Kusunoki et al. |
| 7,312,481 B2 | 12/2007 | Chen et al. |
| 7,348,826 B1 | 3/2008 | Klein et al. |
| 7,378,912 B2 | 5/2008 | Tanahashi et al. |
| 7,460,852 B2 | 12/2008 | Burgener et al. |
| 7,522,079 B1 | 4/2009 | Wu |
| 7,554,397 B2 | 6/2009 | Vitzilaios et al. |
| 7,656,229 B2 | 2/2010 | Deng et al. |
| 7,679,448 B1 | 3/2010 | McAdam et al. |
| 7,796,969 B2 | 9/2010 | Kelly et al. |
| 7,808,415 B1 | 10/2010 | Robbe et al. |
| 7,860,499 B2 | 12/2010 | Burgener et al. |
| 7,863,645 B2 | 1/2011 | Masliah et al. |
| 7,910,993 B2 | 3/2011 | Brindle et al. |
| 7,952,431 B2 | 5/2011 | Quack et al. |
| 7,969,243 B2 | 6/2011 | Bracale et al. |
| 7,969,341 B2 | 6/2011 | Robbe et al. |
| 8,008,731 B2 | 8/2011 | Masliah |
| 8,159,298 B2 | 4/2012 | Quack et al. |
| 8,179,197 B2 | 5/2012 | Bracale et al. |
| 8,188,540 B2 | 5/2012 | Maslaih et al. |
| 8,334,178 B2 | 12/2012 | Maslaih et al. |
| 8,400,222 B2 | 3/2013 | Bracale et al. |
| 8,532,584 B2 * | 9/2013 | Masliah .......................... 455/78 |
| 2002/0093442 A1 | 7/2002 | Gupta |
| 2002/0094795 A1 | 7/2002 | Mitzlaff |
| 2002/0145170 A1 | 10/2002 | Murakami |
| 2003/0073269 A1 | 4/2003 | Tran |
| 2005/0017298 A1 | 1/2005 | Xie et al. |
| 2005/0285189 A1 | 12/2005 | Shibib et al. |
| 2005/0287966 A1 | 12/2005 | Yoshimi et al. |
| 2006/0228850 A1 | 10/2006 | Tsai et al. |
| 2007/0018865 A1 | 1/2007 | Chang et al. |
| 2007/0178856 A1 | 8/2007 | Mitzlaff et al. |
| 2007/0182485 A1 | 8/2007 | Ko |
| 2008/0031382 A1 | 2/2008 | Aoki |
| 2008/0079499 A1 | 4/2008 | Tsai |
| 2008/0291069 A1 | 11/2008 | Inukai et al. |
| 2008/0297386 A1 | 12/2008 | Maloberti et al. |
| 2009/0066549 A1 | 3/2009 | Thomsen et al. |
| 2009/0286492 A1 * | 11/2009 | Mallet-Guy et al. ............ 455/83 |
| 2010/0026393 A1 | 2/2010 | Keerti et al. |

FOREIGN PATENT DOCUMENTS

| | | |
|---|---|---|
| IL | 125022 | 9/2001 |
| JP | 56165350 A | 5/1980 |
| JP | 03-099466 A | 4/1991 |
| JP | 10107214 A | 4/1998 |
| WO | 9956311 | 11/1999 |
| WO | 0139451 | 5/2001 |
| WO | 2006054148 | 5/2006 |
| WO | 2007042850 | 4/2007 |
| WO | 2007075759 A2 | 7/2007 |
| WO | 2008037650 A1 | 4/2008 |

OTHER PUBLICATIONS

Azakkour, A. et al., "Challenges for a new integrated Ultra-wideband (UWB) source," IEEE, 2003 pp. 433-437.

Azakkour, A. et al., "A new integrated moncycle generator and transmitter for Ultra-wideband (UWB) communications," IEEE Radio Frequency Circuits Symposium, 2005 pp. 79-82.

Choi, Y. H. et al., "Gated UWB Pulse Signal Generation," IEEE, 2004 pp. 122-124.

PCT/US2008/001938 Int'l Search Report and Written Opinion, Jun. 26, 2008.

PCT/IB05/003426 Int'l Search Report, Mar. 20, 2006.

PCT/IB05/003426 Written Opinion, May 16, 2007.

PCT/IB05/003029 Int'l Search Report, Jul. 6, 2006.

PCT/IB05/003029 Written Opinion, Mar. 12, 2008.

PCT/US10/27921 Int'l Search Report and Written Opinion, May 10, 2010.

PCT/US10/30770 Int'l Search Report and Written Opinion, Jun. 16, 2010.

PCT/US10/041985 Int'l Search Report and Written Opinion, Sep. 9, 2010.

PCT/US11/32488 Int'l Search Report and Written Opinion, Jun. 28, 2011.

Vaes, H. M. J. et al., "High Voltage, High Current Lateral Devices," IEDM Technical Digest, 1988, pp. 87-90.

Pocha, Michael D. et al. "Threshold Voltage Controllability in Double-Diffused MOS Transistors," IEEE Transactions on Electronic Devices, vol. ED-21, No. 12, Dec. 1994.

Jackel, Lawrence D., et al., "CASFET: A MOSFET-JFET Cascode Device with Ultralow Gate Capacitance," IEEE Transactions on Electron Devices, IEEE SErvice Center, Piscataway, NJ, vol. ED-31, No. 12, Dec. 1, 1984, pp. 1752-1754.

Temes G. C. et al., "Delta Sigma Data Converters, Architectures for Delta Sigma DACs," Chapter 10, Delta-Sigma Data Converters, Theory, Design, and Simulation, New York, IEEE, pp. 309-331, XP002496594, Jan. 1, 1997.

Jerng, A. et al., "Digital-RF Modulator with Self-Tuned RF Bandpass Reconstruction Filter," Conference 2006, IEEE Custom Integrated Circuits, IEEE, Piscataway, NJ, pp. 125-128, XP031052435, Sep. 1, 2006.

U.S. Appl. No. 13/803,792, filed Mar. 14, 2013, Alexandre Bracale, Electronic Circuits including a MOSFET and a Dual-Gate JFET.

U.S. Appl. No. 13/189,342, filed Jul. 22, 2011, Denis Masliah, IGFET Device Having a RF Capability.

CN 201180018327.6 Office Action mailed Dec. 30, 2013.

* cited by examiner

RF SWITCHES

CROSS-REFERENCE TO RELATED APPLICATIONS

This application is a Continuation of U.S. patent application Ser. No. 12/771,339 entitled "RF Switches" and filed on Apr. 30, 2010, now U.S. Pat. No. 8,532,584. This application is related to U.S. Provisional Patent Application No. 61/171,689 filed on Apr. 22, 2009 and entitled "Electronic Circuits including a MOSFET and a Dual-Gate JFET and having a High Breakdown Voltage," to U.S. patent application Ser. No. 12/070,019 filed on Feb. 13, 2008 and entitled "High Breakdown Voltage Double-Gate Semiconductor Device," now U.S. Pat. No. 7,863,645, and to U.S. patent application Ser. No. 12/686,573 filed on Jan. 13, 2010 and entitled "Electronic Circuits including a MOSFET and a Dual-Gate JFET," now U.S. Pat. No. 7,969,243, all three of which are incorporated herein by reference.

BACKGROUND

1. Field of Invention

The present invention relates generally to semiconductor devices and more particularly to radio frequency (RF) switches for use in RF applications.

2. Related Art

FIG. 1 illustrates an exemplary transceiver 100 of the prior art coupled to an antenna 110. The transceiver 100 includes a switch 120, such as a solid-state single pole double throw switch, configured to switch between a power amplifier 130 and a receiver amplifier 140. The transceiver 100 further includes filters 150 disposed between the switch 120 and the antenna 110.

In the prior art, the antenna 110 is sometimes coupled to multiple circuits each comprising a switch 120, power amplifier 130, and receiver amplifier 140, where each such circuit is dedicated to a particular frequency band. Here, the transceiver 100 handles one or more high bands and/or one or more low bands, for example. In these instances the filters 150 selectively remove frequencies outside of the particular frequency band to which the circuit is dedicated.

Most of the power being produced by the power amplifier 130 is at some desired frequency, however, some power also goes into harmonics of that primary frequency. Accordingly, another function of the filters 150 is to remove the higher harmonics of the transmitted signal so that the antenna 110 only transmits at the desired frequency.

In operation, the transceiver 100 transmits an RF signal by coupling the power amplifier 130 to the antenna 110 and receives an RF signal by coupling the receiver amplifier 140 to the antenna 110. It will be appreciated, however, that since the power amplifier 130 and the receiver amplifier 140 are both coupled to the same switch 120, the switch 120 can unintentionally couple the high-power transmitted RF signal onto the receiver transmission line 160, an effect known as parasitic leakage.

Additionally, the switch 120 needs to be able to handle the high voltages produced by the power amplifier, in the range of about 15 to 30 volts. Such voltages are too high for metal oxide semiconductor (MOS) switches to withstand.

SUMMARY

Exemplary articles of manufacture of the present invention comprise semiconductor devices, transceivers, and communication devices. In various embodiments, the articles of manufacture are implemented entirely on silicon substrates using Complementary Metal Oxide Semiconductor (CMOS) technologies. An exemplary article of manufacture comprises a power amplifier, a receiver amplifier, and first and second transmission lines. The first transmission line extends between the power amplifier and an antenna port, and the second transmission line extends between the receiver amplifier and the antenna port. The exemplary embodiment also comprises first and second valves. The first valve is configured to change an impedance of the first transmission line and the second valve is configured to change an impedance of the second transmission line. In the exemplary embodiment the first and second valves are controllable such that when one is open the other is closed. In various embodiments, the article of manufacture additionally comprises control logic configured to oppositely control the first and second valves. In those embodiments in which the article of manufacture comprises a communications device, for example, the article of manufacture can further comprise an antenna coupled to the antenna port.

In various embodiments, the first valve and/or the second valve can include a double-gate semiconductor device that is controllable to couple and decouple the valve to and from ground in order to switch the valve on and off, respectively. Also in various embodiments, the first transmission line includes a transmission line segment and the first valve and/or the second valve can include first and second lines both joined to the first transmission line at a node. In these embodiments, the first line includes a first line segment disposed along the segment of the transmission line, and the second line includes a second line segment disposed along the segment of the transmission line.

The exemplary article of manufacture, in some embodiments, does not include a filter between the power amplifier and the antenna to remove harmonics of the primary frequency since the overall circuit gives rise to a strong attenuation of frequencies on the first transmission line at frequencies above the primary frequency of the power amplifier even while the attenuation around the operating frequency on the first transmission line is inconsequential. In various embodiments, the first and/or second valves have an insertion loss of less than 0.5 dB. Also in various embodiments, the first valve can provide at least 22 dB of isolation at the primary frequency of the power amplifier.

The present invention also provides methods for alternately sending and receiving with an antenna. An exemplary method comprises alternatingly transmitting RF signals from a power amplifier to an antenna and receiving RF signals from the antenna. More specifically, the step of transmitting the RF signals from the power amplifier to the antenna is performed over a transmitter transmission line while simultaneously impeding the RF signals on a receiver transmission line coupled between the receiver amplifier and the antenna. Similarly, the step of receiving RF signals from the antenna is performed over the receiver transmission line while simultaneously impeding RF signals from the power amplifier on the transmitter transmission line. In various embodiments, a CMOS device switches from the power amplifier transmitting RF signals to the antenna over the transmitter transmission line to the receiver amplifier receiving RF signals from the antenna over the receiver transmission line.

In some embodiments impeding the RF signals on the receiver transmission line includes maintaining a first valve, disposed between the receiver transmission line and ground, in an on state. Likewise, in some embodiments, impeding RF signals from the power amplifier on the transmitter transmission line includes maintaining a second valve, disposed between the transmitter transmission line and ground, in an on state. In some of these embodiments, the first and/or second valves include a double-gate semiconductor device and the step of maintaining the valve in the on state includes controlling the gates of the double-gate semiconductor device such that the double-gate semiconductor device conducts between a source and a drain thereof. Controlling the gates of the double-gate semiconductor device such that the double-gate semiconductor device does not conduct between the source and the drain turns the valve off, removing the impedance from the valve on the respective transmission line allowing either transmission from the power amplifier to the antenna, or reception by the receiver amplifier from the antenna.

DETAILED DESCRIPTION

The present disclosure is directed to RF switching devices capable of alternatively coupling an antenna to either a transmitter amplifier or a receiver amplifier. The present disclosure is also directed to articles of manufacture that include such RF switching devices, such as integrated circuits (ICs) and mobile communications devices like Personal Digital Assistants (PDAs), cell phones, smart phones, and so forth. The present disclosure is also directed to methods of operating RF switching devices, and devices that incorporate such RF switching devices.

An exemplary RF switching device of the present invention comprises two valves, one valve configured to control a receiver transmission line disposed between an antenna and a receiver amplifier, and the other valve configured to control a transmitter transmission line between the antenna and a power amplifier. A valve, defined specifically elsewhere herein, comprises a circuit that switchably couples a transmission line to ground. When the circuit is coupled to ground, current flowing through the circuit increases the impedance of the transmission line thereby heavily attenuating signals on the transmission line. When decoupled from ground, the impedance of the transmission line is essentially unaffected and attenuation of signals due to the presence of the value is minimal. The pair of valves is controlled such that when one valve is on the other valve is off, and vice versa, so that the antenna is either receiving signals from the power amplifier or the receiver amplifier is receiving signals from the antenna.

Figure 2:
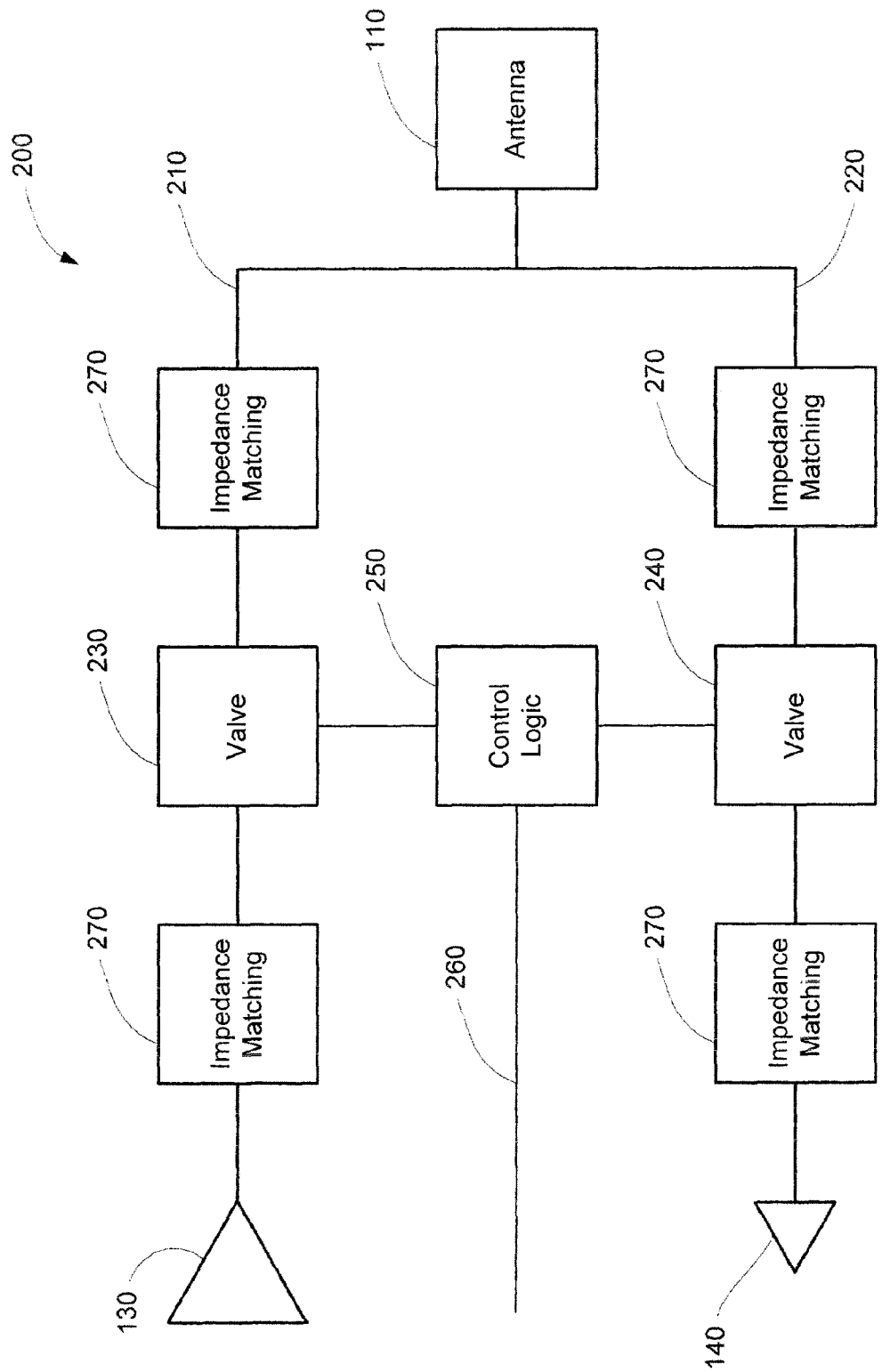
FIG. 2 is a schematic representation of a communications device according to an exemplary embodiment of the invention.

FIG. 2 is a schematic representation of a communications device 200 including an antenna 110, a power amplifier 130, receiver amplifier 140, a transmitter transmission line 210 that couples the power amplifier 130 to the antenna 110, and a receiver transmission line 220 that couples the receiver amplifier 140 to the antenna 110. The device 200 further comprises valves 230 and 240 coupled to the transmission lines 220, 230, respectively. Additionally, the device 200 comprises control logic 250 configured to control the valves 230, 240. Control logic 250 is configured to receive a control signal on a control line 260 and to output opposite signals to each of the two valves 230, 240. For example, if valve 230 receives a high voltage then valve 220 receives a low voltage, and vice versa, according to the control signal. A simple example of control logic 250 is a NAND gate.

The device 200 optionally also comprises impedance matching circuits 270 coupled to the transmission lines 210, 220 between the valves 230, 240 and the antenna 110, and between the valves 230, 240 and the respective amplifiers 130, 140 as shown in FIG. 2. Impedance matching circuits 270 can comprise, in some embodiments, a capacitor coupled between ground and a node on the transmission line 210, 220, and an inductor disposed in-line with the transmission line 210, 220 between the node and the respective valve 230, 240.

In some embodiments of the device 200, the power amplifier 130, receiver amplifier 140, valves 230, 240, and impedance matching circuits 250 are disposed on a semiconductor chip within a package. In these embodiments, a connection is made between the antenna 110 and the transmission lines 210, 220 through the package, for example, by joining bonding pads on the chip to bonding pads on the package, and by joining bonding pads on the package to bonding pads on a circuit board that includes the antenna 110. In some embodiments the chip comprises a CMOS chip. A terminal end of a transmission line 210, 220 for joining the antenna 110 is referred to herein as an antenna port. Though not illustrated in FIG. 2, the antenna port is at the intersection of transmission lines 210, 220.

It will also be appreciated that the device 200 can additionally include further valves and amplifiers in parallel to the ones shown in FIG. 2 to handle multiple frequency bands. For example, a high band and a low band can be accommodated by two power amplifiers 130 and two receiver amplifiers 140, each amplifier having a dedicated transmission line to the antenna 110 and each dedicated transmission line controlled by a dedicated valve.

The switch is connecting the antenna port (in many modern cases, the antenna is printed on the circuit board or on a specific substrate mounted on the circuit board) on one side to the input of the low noise amplifier of the receiver in one position or the output of power amplifier in the other position.

Figure 4:
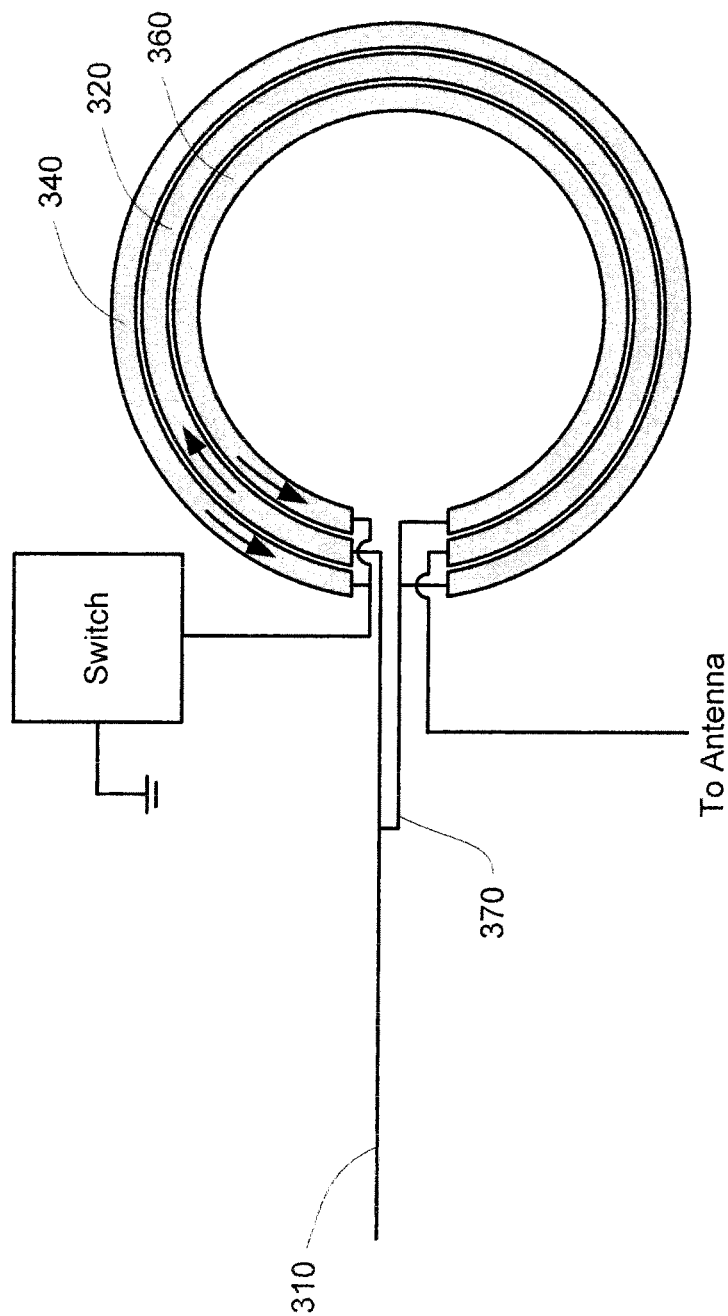
FIG. 4 is a schematic representation of a layout of the line segments of a valve according to an exemplary embodiment of the invention.
Figure 5:
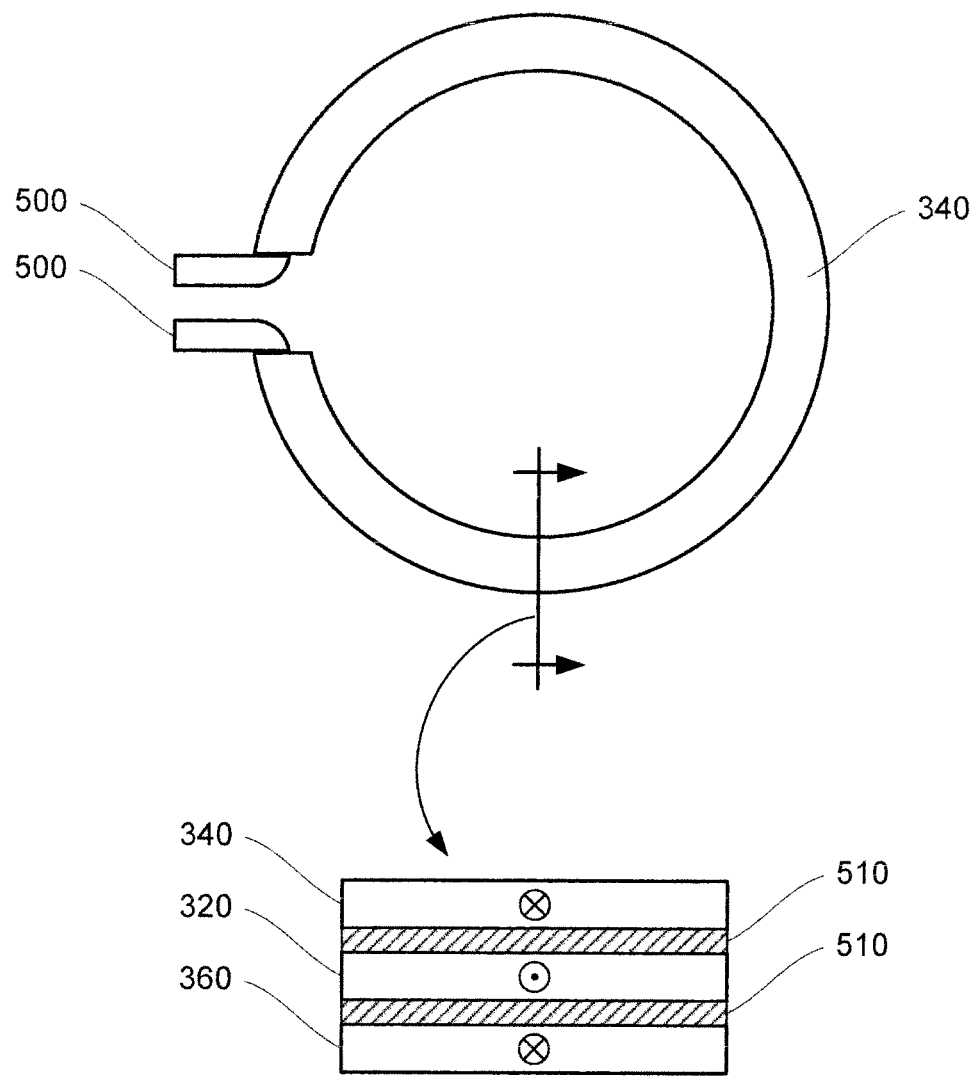
FIG. 5 is a schematic representation of a layout of the line segments of a valve according to another exemplary embodiment of the invention.
Figure 6:
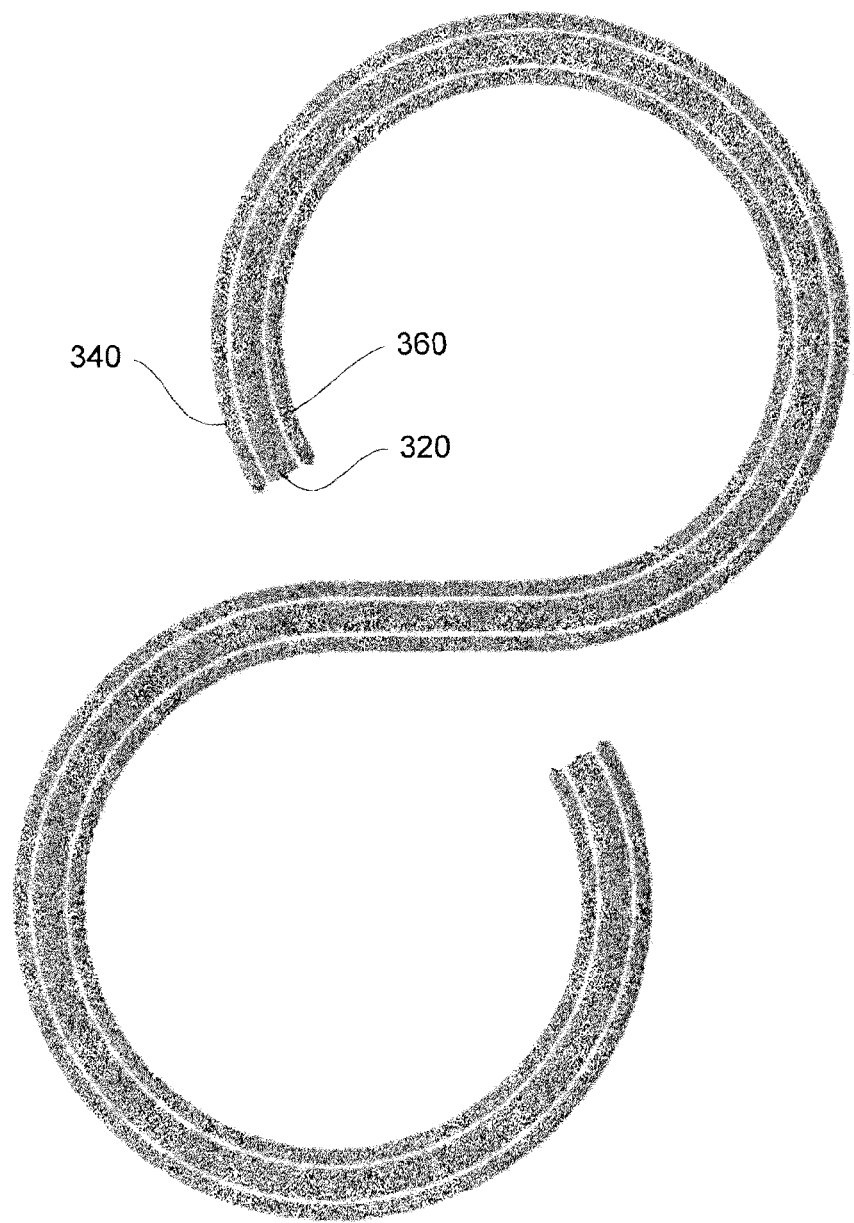
FIG. 6 is a schematic representation of a layout of the line segments of a valve according to still another exemplary embodiment of the invention.

A valve, as used herein, is defined as an electrical circuit having the following components, arrangement, and properties. Specifically, a valve comprises a segment of a transmission line, a first conductive line joined at a node to the transmission line and including a segment that is disposed along the segment of the transmission line, and a switch that can couple and decouple the first line to ground. As used here, one line segment is disposed along another line segment where the two segments are disposed next to one another over some common path, where the path can comprise, for example, a straight line, a curved line, a figure-8, or a square wave pattern. Exemplary arrangements of the line segments are illustrated in FIGS. 4-6.

The segments of the first and transmission lines are arranged such that when current is flowing through both, the current in the transmission line flows in one direction while current in the first line flows in the opposite direction. Since currents flowing in the segments of the first and transmission lines flow in opposite directions, and since the segment of the first line is disposed along the segment of the transmission line, when currents flow through both the impedance of the segment of the transmission line increases compared to when no current is flowing in the first line. The increased impedance serves to attenuate the signals propagating along the transmission line.

Throughout this disclosure a valve is considered to be in the "on" state when current is flowing through the first line, and in the "off" state otherwise. The impedance of the transmission line and the attenuation of RF signals on the transmission line is high when the valve is on, and low when the impedance valve is off. The impedance actually realized on the transmission line is dependent on the frequency of the signal as well as a function of the geometries of the line segments and the amount of current flowing in each.

Valves, as used herein, are distinguished from switches 120 of the prior art in that the switches 120 alternately couple one transmission line to either of two other transmission lines, whereas a valve as used herein does not break transmission lines. Valves, as used herein, are also distinguished from field-effect transistors (FETs).

Figure 3:
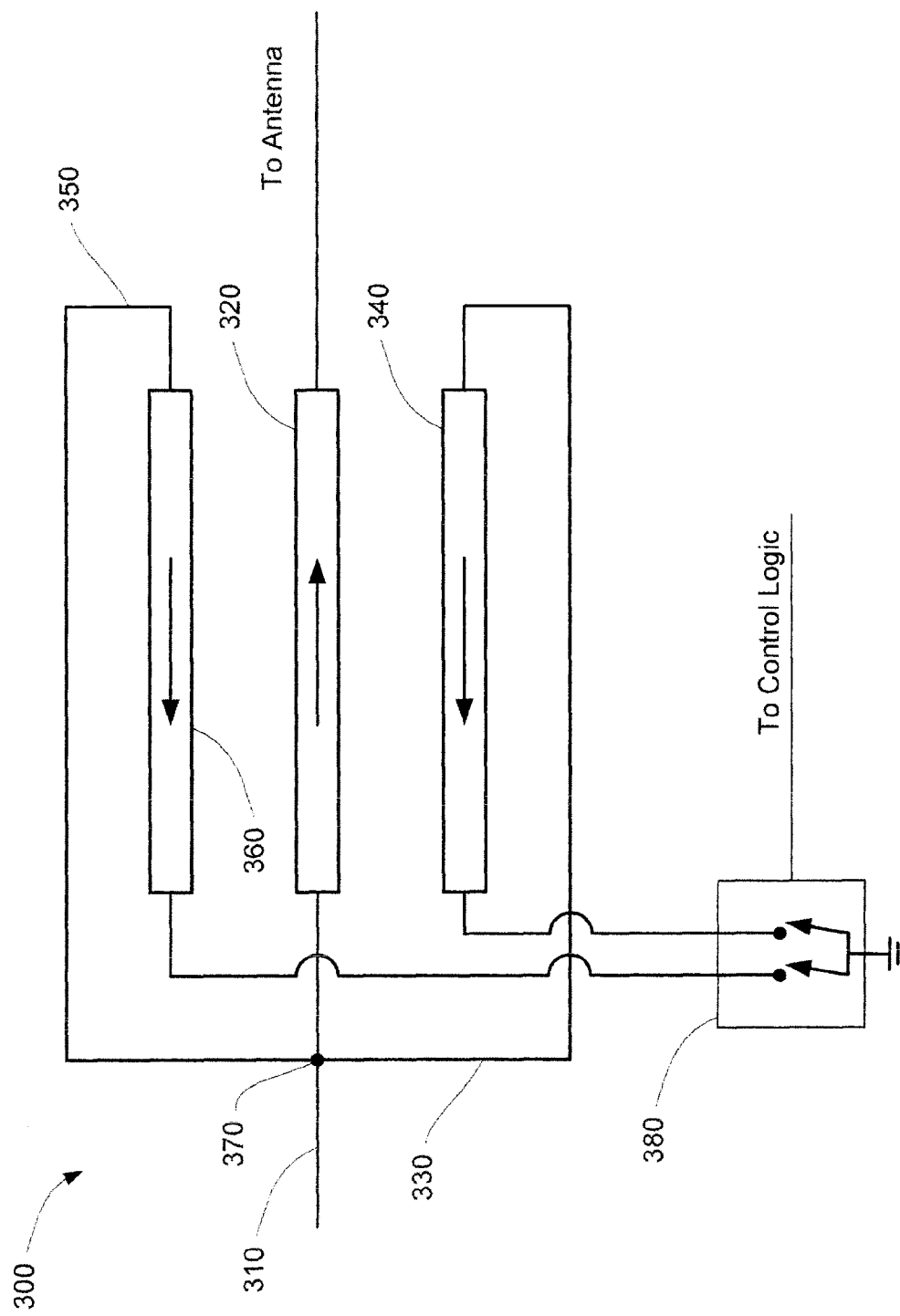
FIG. 3 is a schematic representation of a valve according to an exemplary embodiment of the invention.

FIG. 3 schematically illustrates an exemplary valve 300. The valve 300 comprises a transmission line 310 including a transmission line segment 320, and a first line 330 including a first line segment 340 disposed along the transmission line segment 320. Optionally, valve 300 also comprises a second line 350 and a second line segment 360 also disposed along the transmission line segment 320. It will be understood that although line segments 320, 340, and 360 are represented differently in FIG. 3 than the remainders of their respective lines, the physical dimensions (width and thickness) of the metal traces within these line segments may be no different than elsewhere on the lines.

The lines 330, 350 are joined to the transmission line 310 at a node 370. The valve 300 also comprises a switch 380 that can couple and decouple the lines 330, 350 to ground. The line segments 320 and 340, and optionally 360, are configured such that when currents are flowing through each, the currents flowing through the first and second line segments 340, 360 are flowing in one direction while the current flowing through the transmission line segment 320 is flowing in the opposite direction, as illustrated. In those embodiments that do not include second line 350, and when the valve is in the on state, the currents flowing through transmission line 310 and through first line 330 are each about half of the current received by the valve 300. In those embodiments that do include the second line 350, the current flowing through transmission line 310 is about half of the current received by the valve 300, while the currents in each of the lines 330, 350 are about one quarter of the current received by the valve 300. In some embodiments of the valve 300, the valve 300 has an insertion loss of less than 0.5 dB. Preferably, any path length difference between the distances from the node 370 to the segments 340, 360 should be an integer multiple of the wavelength so that phase is maintained along the segments 340, 360.

An exemplary portion of a valve is shown in FIG. 4. In this example, the transmission line segment 320 comprises a circular arc with the first and second line segments 340, 360 disposed along the transmission line segment 320 on either side. The direction of current flow in each of the line segments 320, 340, 360 is shown with an arrow.

The lengths of the line segments 320, 340, 360 are similar but not equal in the example of FIG. 4. It will be appreciated that lengths of the line segments 320, 340, 360 can be made equal by having each arc subtend a different angle. Exemplary diameters of the circular arcs are from 300 µm to 1 mm. Also, the widths of the line segments 320, 340, 360 in FIG. 4 are equal, but in some embodiments the widths of the first and second line segments 340, 360 are the same but different than the width of the transmission line segment 320. In further embodiments the widths of each line segment 320, 340, 360 are different. Connections to the line segments 320, 340, 360 can be made through vias to traces in layers above or below the plane of the drawing. Exemplary widths of the line segments 320, 340, 360 are from 10 µm to 300 µm.

Another exemplary portion of a valve is shown in FIG. 5. In this example, the line segments 320, 340, 360 comprise stacked circular arcs with the line segments 340 and 360 disposed along the transmission line segment 320 by being above and below the transmission line segment 320. In FIG. 5 the line segments 320, 340, 360 are shown in both a top plan view and in cross-section. The top plan view shows a pair of leads 500 that can be connected to any one of the line segments 320, 340, 360. Connections to the line segments 340 and 360 can alternatively be made through vias. The direction of current flow in each of the line segments 320, 340, 360 are shown in the cross-sectional view. The cross-section also shows dielectric layers 510 between the line segments 320, 340, 360. In this embodiment the lengths, widths, and thicknesses of the line segments 320, 340, 360 are the same, however, other embodiments are not so limited. Exemplary diameters of the circular arcs and widths of the line segments 320, 340, 360 are again from 300 µm to 1 mm and from 10 µm to 300 µm, respectively.

Still another exemplary portion of a valve is shown in FIG. 6. In this example, the transmission line segment 320 comprises a figure-8 with line segments 340, 360 disposed along the transmission line segment 320. In this embodiment the lengths and thicknesses of the line segments 320, 340, 360 are the same, while the width of the transmission line segment 320 is greater than the widths of the line segments 340, 360. Exemplary diameters of the circular arcs of the lobes of the figure-8 and of the widths of the line segments 320, 340, 360 are again from 300 µm to 1 mm and from 10 µm to 300 µm, respectively.

Figure 7:
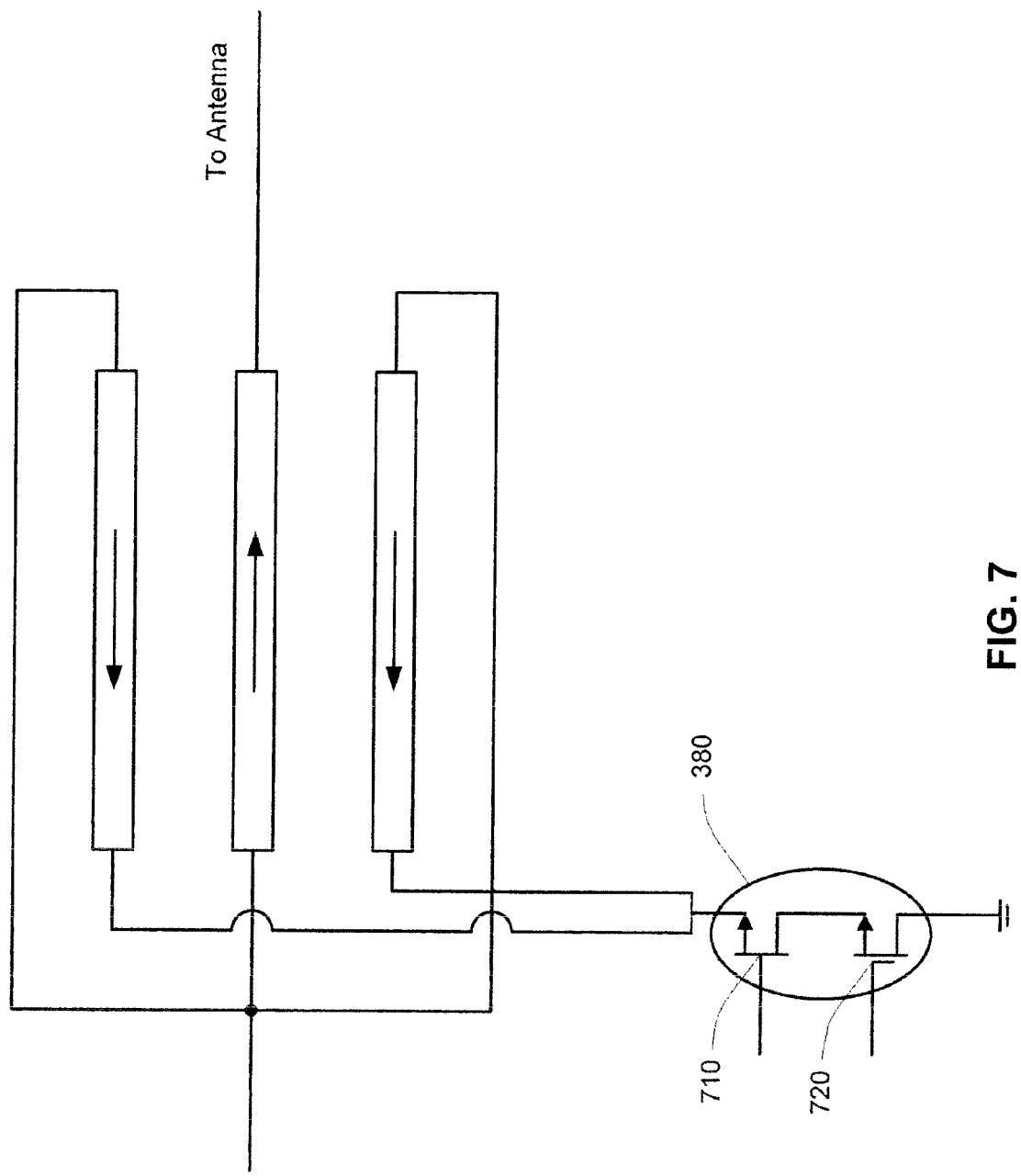
FIG. 7 is a schematic representation of a valve according to another exemplary embodiment of the invention.

FIG. 7 schematically illustrates an exemplary embodiment of the valve 300 in which the switch 380 comprises a double-gate semiconductor device comprising a source and a drain and controlled by MOS gate 710 and a junction gate 720. U.S. patent application Ser. No. 12/070,019, noted above, discloses such configurations. As provided in U.S. patent application Ser. No. 12/070,019, the MOS gate 710 and the junction gate 720 are coupled together by control circuitry that can simply comprise a capacitor, in some instances. It will be appreciated that single-gate semiconductor devices can also be used for the switch 380.

Figure 8:
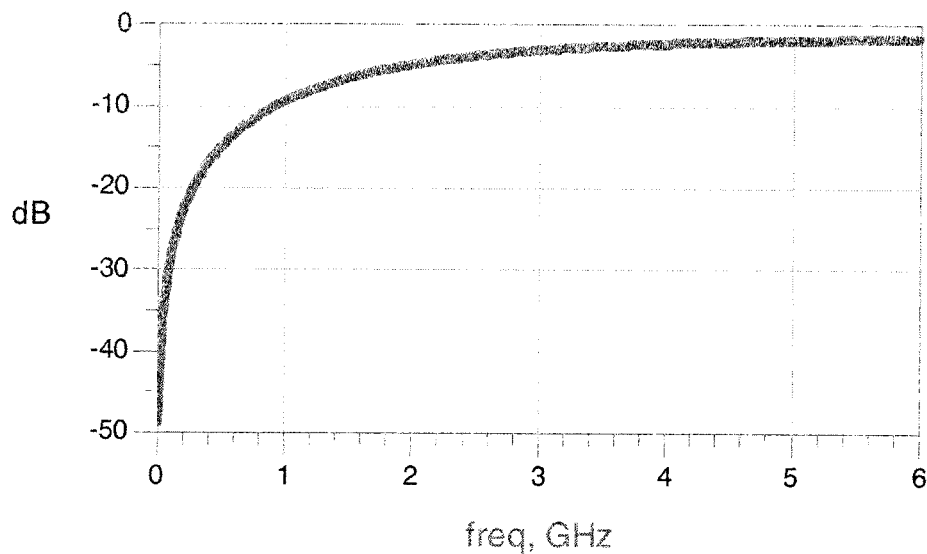
FIG. 8 is a graph showing attenuation as a function of signal frequency on a transmission line due to an exemplary valve in the "on" state, according to an exemplary embodiment of the invention.
Figure 9:
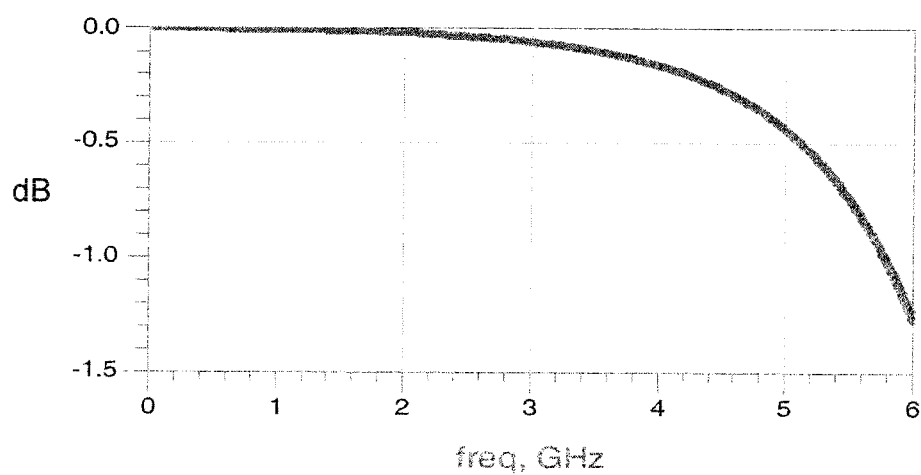
FIG. 9 is a graph showing attenuation as a function of signal frequency on a transmission line due to an exemplary valve in the "off" state, according to an exemplary embodiment of the invention.

FIG. 8 is a graph showing attenuation as a function of signal frequency on a transmission line due to an exemplary valve in the "on" state, and FIG. 9 shows a similar graph for the "off" state. Both graphs cover the same frequency range out to 6 GHz but employ different vertical scales. In FIG. 8 it can be seen that when the valve is on the attenuation at 1 GHz is about 10 dB and increases with decreasing frequency. When the valve is off, in FIG. 9, the attenuation is substantially small at lower frequencies, reaching about 1.3 dB at 6 GHz. In an operating range up to about 2 GHz, therefore, it can be seen that attenuation of the RF signals on the transmission lines is insignificant when the valve is off. On the other hand, when the valve is on, RF signals from the power amplifier 130 are significantly attenuated. For additional attenuation, multiple valves can be arranged in series, for example. In some embodiments, the isolation provided at the primary frequency of the power amplifier 130 by a valve that is on is at least 22 dB.

Figure 10:
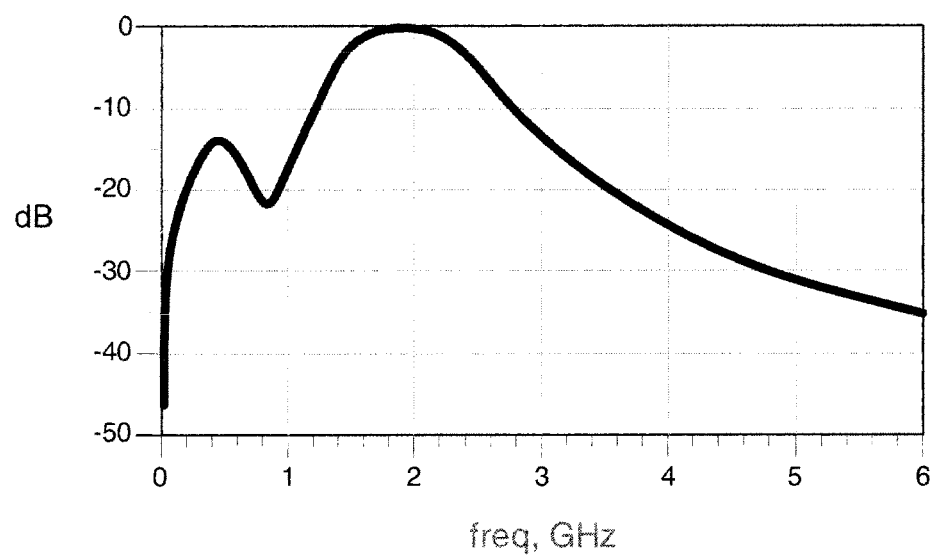
FIG. 10 is a graph showing overall attenuation on a transmitter transmission line according to an exemplary embodiment of the invention.

It will be appreciated that the graphs shown in FIGS. 8 and 9 show the behavior of the exemplary valve when removed from the context of the overall circuit. FIG. 10 illustrates the overall attenuation of the transmitter transmission line 210 when the valve 230 is off, where the difference between FIG. 9 and FIG. 10 is caused by the presence of the rest of the circuitry of device 200. It can be seen from FIG. 10 that when the power amplifier 130 is transmitting at a frequency of about 2 GHz, the signal is largely unattenuated, however, a second harmonic at about 4 GHz will be heavily attenuated, as will be the even higher harmonics. Accordingly, since the transmitter transmission line 210, even when the valve 230 is on, strongly attenuates frequencies above the frequency of the primary frequency of the power amplifier 130, articles of manufacture that include the circuitry of FIG. 2 may not include a filter between the power amplifier 130 and the antenna 110 to remove harmonics of the primary frequency. In some of these embodiments, the attenuation of the second harmonic is at least 20 dB without such a filter. Higher order harmonics are even more heavily attenuated. For example, the attenuation of a third harmonic can be at least 30 dB in some instances.

Figure 11:
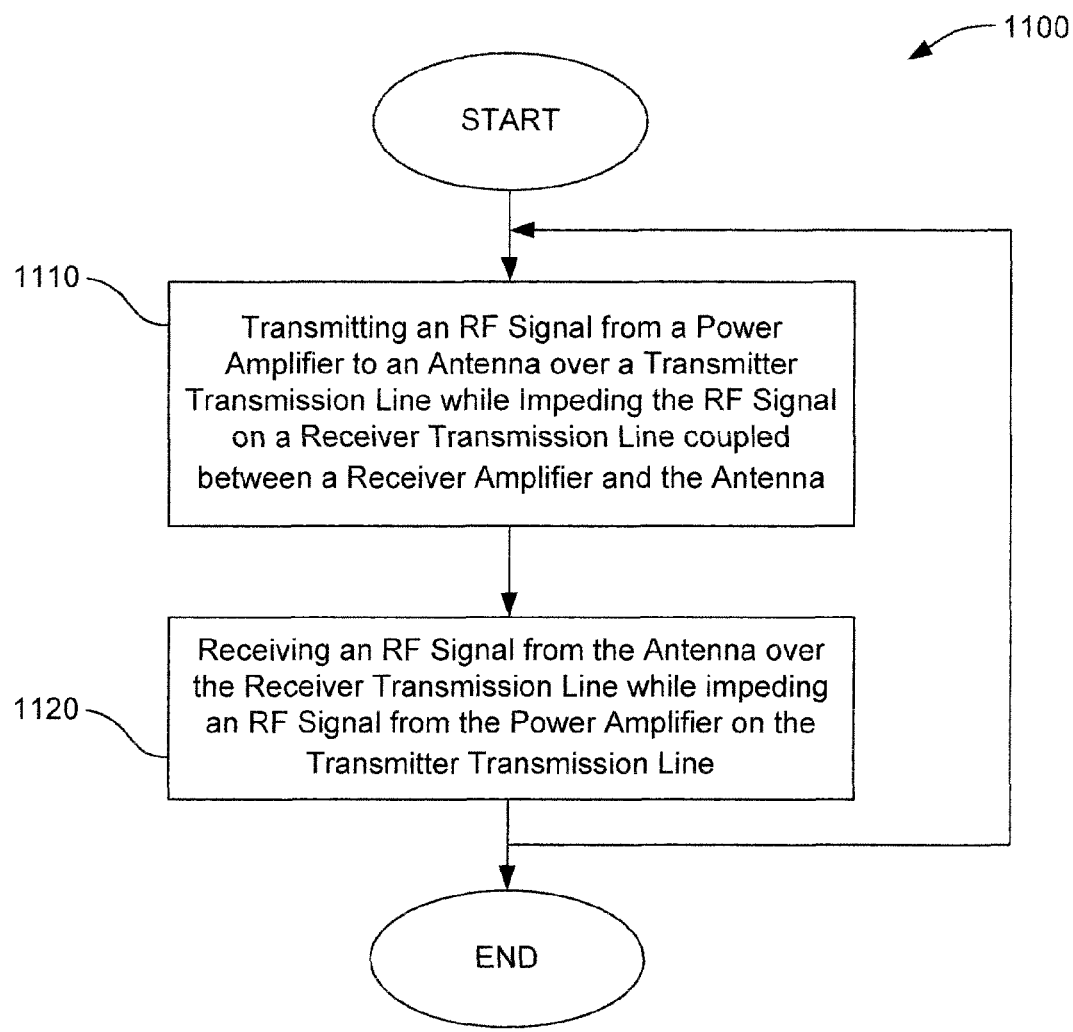
FIG. 11 is a flowchart representation of a method for sending and receiving signals according to an exemplary embodiment of the invention.

FIG. 11 provides a flowchart representation of an exemplary method 1100 of the present invention. The method 1100 can be, for example, a method of operating a communications device comprising an antenna coupled to a transceiver including an RF switching device. The method 1100 provides alternatingly switching between two steps, a step 1110 of transmitting an RF signal, and a step 1120 of receiving an RF signal.

Figure 1:
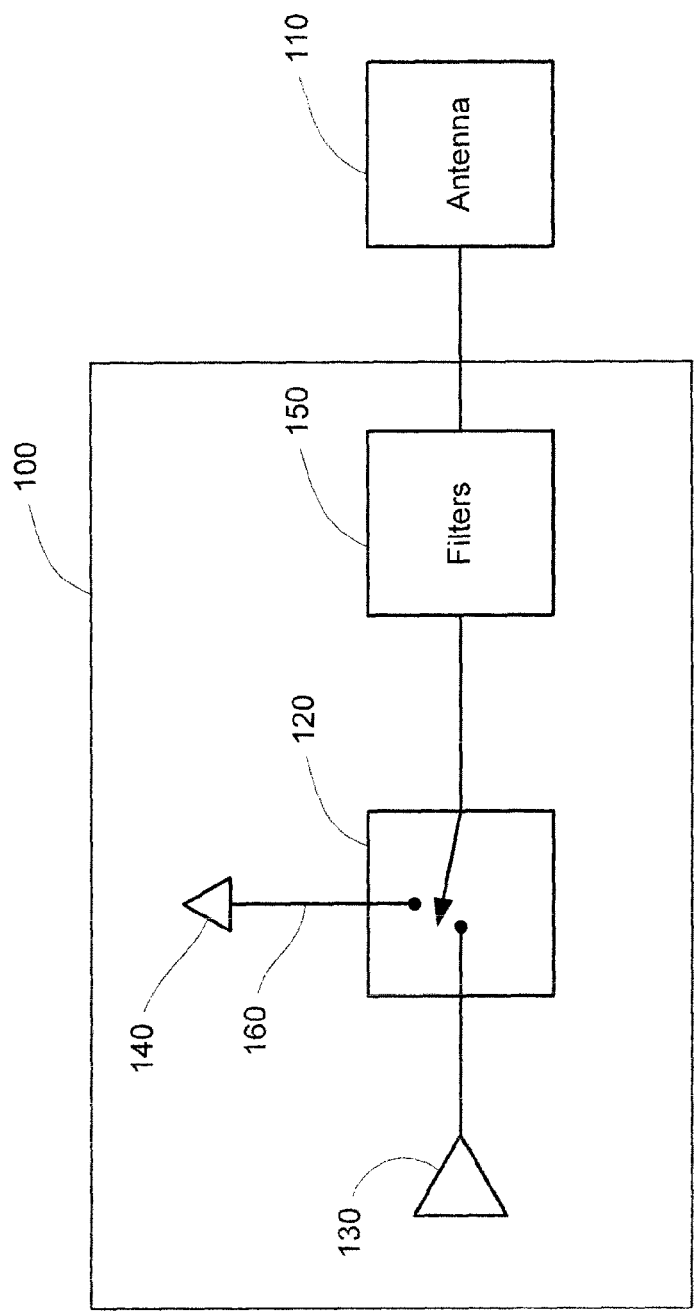
FIG. 1 is a schematic representation of a prior art transceiver coupled to an antenna.

In the step 1110 of transmitting the RF signal, the RF signal is transmitted from a power amplifier to an antenna over a transmitter transmission line. The step 1110 includes, at the same time, impeding the RF signal on a receiver transmission line coupled between a receiver amplifier and the antenna. "Impeding," when used herein with reference to a signal, is defined to mean attenuating with an impedance that is being electrically induced in the transmission line carrying the signal. Accordingly, it will be understood that when, as in the prior art illustrated by FIG. 1, a signal on a transmission line is prevented from reaching a receiver amplifier 130 by a switch 120 that broke the electrical path between the receiver amplifier 130 and the antenna 110, the switch is not impeding the signal within the present usage, even though the switch 120 is in fact preventing the signal from reaching the receiver amplifier 130. The other verb tenses of "impeding" are similarly defined.

In the step 1120 an RF signal is received from the antenna over the receiver transmission line. The step 1120 includes, at the same time, impeding an RF signal from the power amplifier on the transmitter transmission line. The RF signal from the power amplifier can be, for example, just noise when the power amplifier is not transmitting.

In either step 1110 or 1120, in various embodiments, impeding the RF signal on either transmission line includes maintaining a valve in an on state, where the valve is disposed between the transmission line and ground. In some of these embodiments, the valve includes a double-gate semiconductor device. In these same embodiments, maintaining the valve in the on state includes controlling the gates of the double-gate semiconductor device such that the double-gate semiconductor device conducts between its source and its drain. In further embodiments, a CMOS device switches from the power amplifier transmitting RF signals to the antenna over the transmitter transmission line in step 1110 to the receiver amplifier receiving RF signals from the antenna over the receiver transmission line in step 1120.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive. It will be recognized that the terms "comprising," "including," and "having," as used herein, are specifically intended to be read as open-ended terms of art.

What is claimed is:

1. An article of manufacture comprising:
   an amplifier;
   an antenna port;
   a transmission line extending between the amplifier and the antenna port and
      including
      a node between the amplifier and the antenna port, and
      a transmission line segment between the amplifier and the antenna port;
   a first valve line joined to the transmission line at the node and including a first valve line segment disposed along the transmission line segment;
   a second valve line also joined to the transmission line at the node and including a second valve line segment disposed along the transmission line segment;
   a switch configured to couple and decouple the first and second valve lines to and from ground;
   the first and second valve lines being arranged such that when a current is flowing in the transmission line and when the switch couples the first and second valve lines to ground, currents flowing from the node to the ground through the first and second valve line segments impedes the current flow through the transmission line segment.

2. The article of manufacture of claim 1 further comprising an antenna coupled to the antenna port.

3. The article of manufacture of claim 1 further comprising control logic configured to control the switch.

4. The article of manufacture of claim 1 wherein the switch includes a double-gate semiconductor device.

5. The article of manufacture of claim 1 wherein the article of manufacture does not include a filter between the amplifier and the antenna port to remove harmonics of a primary frequency.

6. The article of manufacture of claim 1 wherein the transmission line segment comprises a circular arc.

7. The article of manufacture of claim 1 wherein the first valve line segment is disposed in a first layer below the transmission line segment and the second valve line segment is disposed in a second layer above the transmission line segment.

8. The article of manufacture of claim 1 wherein the transmission line segment and the first and second valve line segments are all disposed in a same layer.

9. A method comprising:
  transmitting an RF signal from a power amplifier to an antenna over a transmitter transmission line while impeding the RF signal on a receiver transmission line coupled between a receiver amplifier and the antenna, where impeding the RF signal on the receiver transmission line includes maintaining in an on state a valve disposed between the receiver transmission line and ground; and then switching to
  receiving an RF signal from the antenna over the receiver transmission line while impeding an RF signal from the power amplifier on the transmitter transmission line.

10. The method of claim 9 wherein the valve includes a double-gate semiconductor device and maintaining the valve in the on state includes controlling the gates of the double-gate semiconductor device such that the double-gate semiconductor device conducts between a source and a drain thereof.

11. The method of claim 9 wherein impeding RF signals from the power amplifier on the transmitter transmission line includes maintaining a valve, disposed between the transmitter transmission line and ground, in an on state.

12. The method of claim 11 wherein the valve includes a double-gate semiconductor device and maintaining the valve in the on state includes controlling the gates of the double-gate semiconductor device such that the double-gate semiconductor device conducts between a source and a drain thereof.

13. The method of claim 9 wherein a CMOS device switches from the power amplifier transmitting RF signals to the antenna over the transmitter transmission line to the receiver amplifier receiving RF signals from the antenna over the receiver transmission line.

14. The method of claim 9 wherein impeding the RF signal on the receiver transmission line provides an isolation of at least 22 dB at the primary frequency of the power amplifier.

* * * * *